United States Patent
Davis et al.

(10) Patent No.: US 12,292,110 B1
(45) Date of Patent: May 6, 2025

(54) COMPONENT MOUNTING AND DRIVE IN A GEARED TURBOFAN ARCHITECTURE

(71) Applicant: RTX CORPORATION, Farmington, CT (US)

(72) Inventors: Todd A. Davis, Tolland, CT (US); David Allen Stachowiak, Durham, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/417,472

(22) Filed: Jan. 19, 2024

(51) Int. Cl.
*F16H 57/08* (2006.01)
*F02C 7/32* (2006.01)

(52) U.S. Cl.
CPC ............. *F16H 57/082* (2013.01); *F02C 7/32* (2013.01); *F05D 2220/36* (2013.01); *F05D 2260/40311* (2013.01)

(58) Field of Classification Search
CPC ...... F16H 57/082; F02C 7/32; F05D 2220/36; F05D 2260/40311
See application file for complete search history.

(56) References Cited

U.S. PATENT DOCUMENTS

| | | | |
|---|---|---|---|
| 11,208,958 B2 * | 12/2021 | Sheridan | F16H 1/28 |
| 11,754,002 B2 | 9/2023 | Niepceron et al. | |
| 2018/0238241 A1 * | 8/2018 | Sheridan | F02C 3/04 |
| 2020/0248632 A1 * | 8/2020 | Leque | F02C 7/275 |
| 2023/0399983 A1 * | 12/2023 | Ganiger | F02K 3/06 |

FOREIGN PATENT DOCUMENTS

| | | | | |
|---|---|---|---|---|
| FR | 3107938 A1 * | 9/2021 | | B60K 17/04 |
| WO | WO-2021116622 A1 * | 6/2021 | | F01D 25/18 |
| WO | WO-2021240094 A1 * | 12/2021 | | F02C 7/32 |

* cited by examiner

*Primary Examiner* — Justin Holmes
(74) *Attorney, Agent, or Firm* — Carlson, Gaskey & Olds, P.C.

(57) ABSTRACT

A fan drive gear system for a turbine engine includes a sun gear that is configured to be driven by an engine shaft rotatable about an axis. A plurality of intermediate gears are coupled to the sun gear, a ring gear is coupled to the plurality of intermediate gears, and a carrier supports rotation of the plurality of intermediate gears. The carrier includes a gear portion and an accessory component that is coupled to and driven by the gear portion of the carrier.

20 Claims, 4 Drawing Sheets

COMPONENT MOUNTING AND DRIVE IN A GEARED TURBOFAN ARCHITECTURE

TECHNICAL FIELD

The present disclosure relates generally to fan drive gear system for turbofan engine with a component driven by a portion of the fan drive gear system.

BACKGROUND

A turbine engine typically includes a fan section, a compressor section, a combustor section, and a turbine section. A speed reduction device such as an epicyclical gear assembly may be utilized to drive the fan section such that the fan section may rotate at a speed different than the turbine section so as to increase the overall propulsive efficiency of the engine. Accessory components such as motors and pumps are utilized to support operation of the engine. The accessory components are conventionally driven by a coupling to an engine shaft. Turbine engine manufacturers continue to seek further improvements to engine performance including improvements to thermal, transfer and propulsive efficiencies.

SUMMARY

A fan drive gear system for a turbine engine according to an exemplary embodiment of this disclosure includes, among other possible things, a sun gear that is configured to be driven by an engine shaft that is rotatable about an axis, a plurality of intermediate gears that are coupled to the sun gear, a ring gear that is coupled to the plurality of intermediate gears, a carrier supporting rotation of the plurality of intermediate gears, the carrier includes a gear portion, and an accessory component that is coupled to the gear portion of the carrier.

In a further embodiment of the foregoing fan drive gear system, the ring gear assembly is attached to a static engine structure and the carrier is rotatable about the axis.

In a further embodiment of any of the foregoing, the fan drive gear system further includes a flexible coupling between the ring gear and the static engine structure and the accessory component is mounted to the flexible coupling.

In a further embodiment of any of the foregoing fan drive gear systems, the accessory component is mounted downstream of the carrier to a portion of the static engine structure.

In a further embodiment of any of the foregoing fan drive gear systems, the carrier includes a forward side and an aft side and the gear portion is mounted to the aft side of the carrier.

In a further embodiment of any of the foregoing fan drive gear systems, the carrier includes a carrier frame and a torque frame and the gear portion is mounted to the torque frame.

In a further embodiment of any of the foregoing fan drive gear systems, the gear portion is formed as an integral portion of the carrier.

In a further embodiment of any of the foregoing, the fan drive system further includes a flexible mount between the ring gear and a static engine structure and both the ring gear and the accessory component are mounted to the flexible mount.

In a further embodiment of any of the foregoing fan drive gear systems, the accessory component includes a fluid pump.

In a further embodiment of any of the foregoing fan drive gear systems, the accessory component includes an electric motor/generator.

A turbine engine assembly according to another exemplary embodiment of this disclosure includes, among other possible things, a static engine structure, a fan section that includes a plurality of blades that are rotatable about an axis, a fan drive gear system that includes a sun gear that is configured to be driven by an engine shaft rotatable about an axis, a plurality of intermediate gears that are coupled to the sun gear, a ring gear that is coupled to the plurality of intermediate gears, and a carrier that supports rotation of the plurality of intermediate gears. The carrier includes a gear portion, an accessory component that is coupled to the gear portion of the carrier, and a fan drive shaft that is coupled to carrier to drive the fan section.

In a further embodiment of the foregoing turbine engine assembly, the ring gear assembly is fixed to a static engine structure through a flexible mount. The carrier is rotatable about the axis and the accessory component is mounted to the static engine structure.

In a further embodiment of any of the foregoing turbine engine assemblies, the ring gear assembly is attached to a static engine structure through a flexible coupling. The carrier is rotatable about the axis and the accessory component is mounted to the flexible coupling.

In a further embodiment of any of the foregoing turbine engine assemblies, the accessory component is mounted downstream of the carrier to a portion of the static engine structure.

In a further embodiment of any of the foregoing turbine engine assemblies, the carrier includes a forward side and an aft side and the gear portion is mounted to the aft side of the carrier.

In a further embodiment of any of the foregoing turbine engine assemblies, the accessory component includes one of a fluid pump or an electric motor/generator.

A method of powering an accessory component of a turbine engine assembly according to another exemplary embodiment of this disclosure includes, among other possible things, assembling a fan drive gear system that includes a sun gear that is configured to be driven by an engine shaft rotatable about an axis, a plurality of intermediate gears that are coupled to the first gear portion of the sun gear, a ring gear that is coupled to the plurality of intermediate gears, and a carrier supporting rotation of the plurality of intermediate gears. The carrier includes a gear portion, an accessory component that is mounted proximate the fan drive gear system, a driven gear of the accessory component that is coupled to the gear portion of the carrier, and a fan drive shaft that is coupled to the carrier to drive a fan section.

In a further embodiment of the foregoing, the method further includes assembling the fan drive gear system such that the ring gear assembly is attached to a static engine structure through a flexible mount. The carrier is rotatable about the axis and the accessory component is mounted to the static engine structure.

In a further embodiment of any of the foregoing, the method further includes assembling the fan drive gear system such that the ring gear assembly is attached to a static engine structure through a flexible mount. The carrier is rotatable about the axis and the accessory component is mounted to the flexible coupling.

In a further embodiment of any of the foregoing, the method further includes assembling the fan drive gear system such that the gear portion is an integral part of the carrier.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
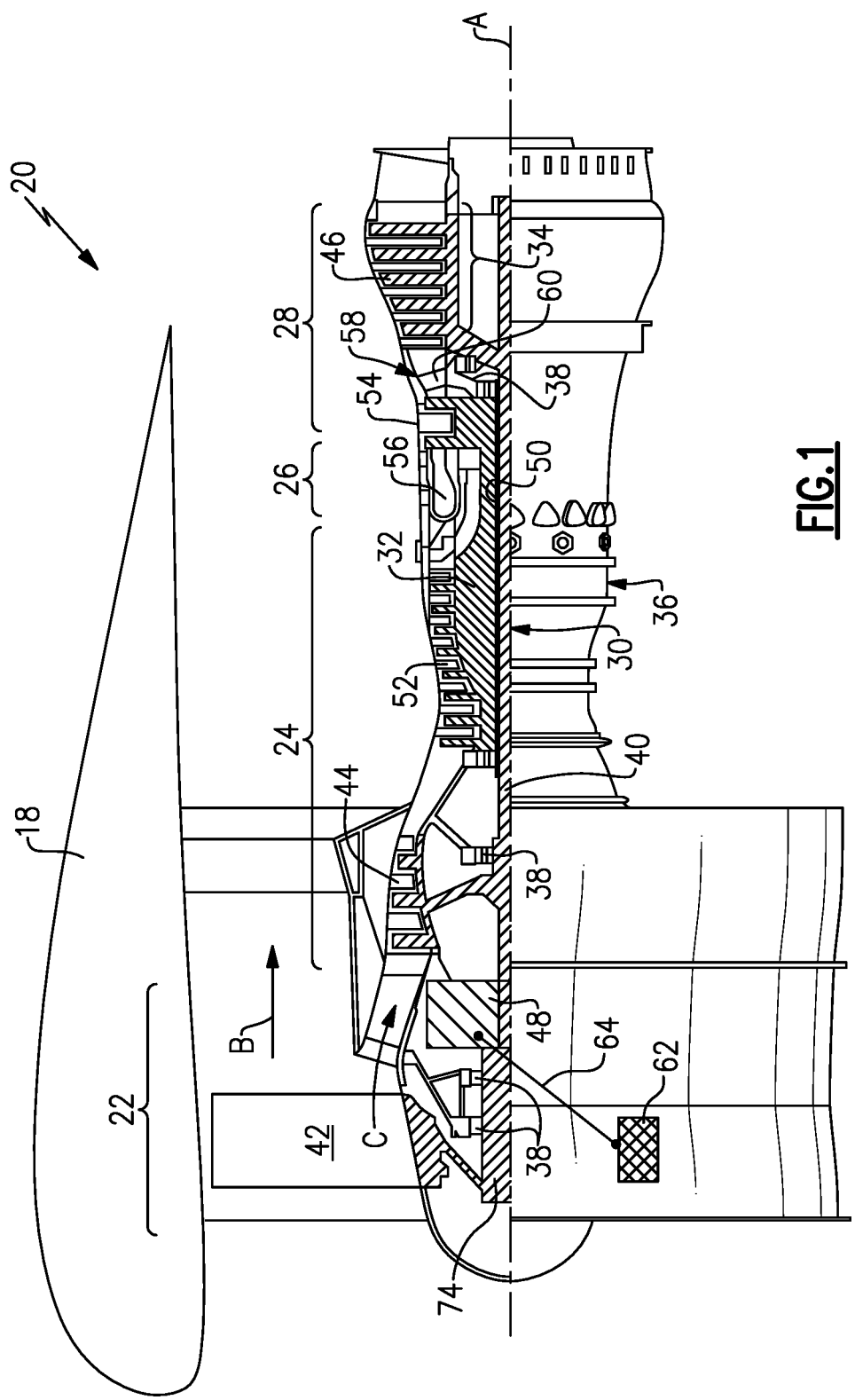
FIG. 1 is a schematic view of an example gas turbine engine including a fan drive gear system.

FIG. 1 schematically illustrates a gas turbine engine 20 with an epicyclic fan drive gear system 48 that drives a fan section 22 and an accessory component 62. The accessory component is driven through a coupling 64 to a gear attached or integral to a rotating carrier of the gear system 48.

The gas turbine engine 20 is disclosed herein as a two-spool turbofan that generally incorporates a fan section 22, a compressor section 24, a combustor section 26 and a turbine section 28. The fan section 22 includes a plurality of fan blades 42 and drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures, turbofans, turboprop, open rotor configurations and any other gas turbine engine architecture.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as the fan drive gear system 48 to drive the fan section 22 at a lower speed than the low speed spool 30. The high speed spool 32 includes an outer shaft 50 that interconnects a second (or high) pressure compressor 52 and a second (or high) pressure turbine 54. The low pressure turbine 46 includes a plurality of turbine rotors 34. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, the fan drive gear system 48 may be located aft of the low pressure compressor 44, or aft of the combustor section 26 or even aft of turbine section 28, and fan section 22 may be positioned forward or aft of the fan drive gear system 48.

The engine 20 in one example is a high-bypass geared aircraft engine. the example engine 20 includes a bypass ratio greater than 20, with an example embodiment being greater than 32 and less than 72.

The fan drive gear system 48 is an epicycle gear train with a gear reduction ratio of greater than about 2:1 and less than about 18:1. In another example embodiment, the fan drive gear system 48 provides a gear reduction ratio of between 5:1 and 14:1. The gear system 48 is coupled to a fan shaft 74 to drive the fan section 22 about the engine axis A. It should be understood, however, that the above parameters are only exemplary of one embodiment of a geared engine architecture and that the present disclosure is applicable to other gas turbine engine architectures including turbofan, turboshaft, and open rotor engines.

Figure 2:
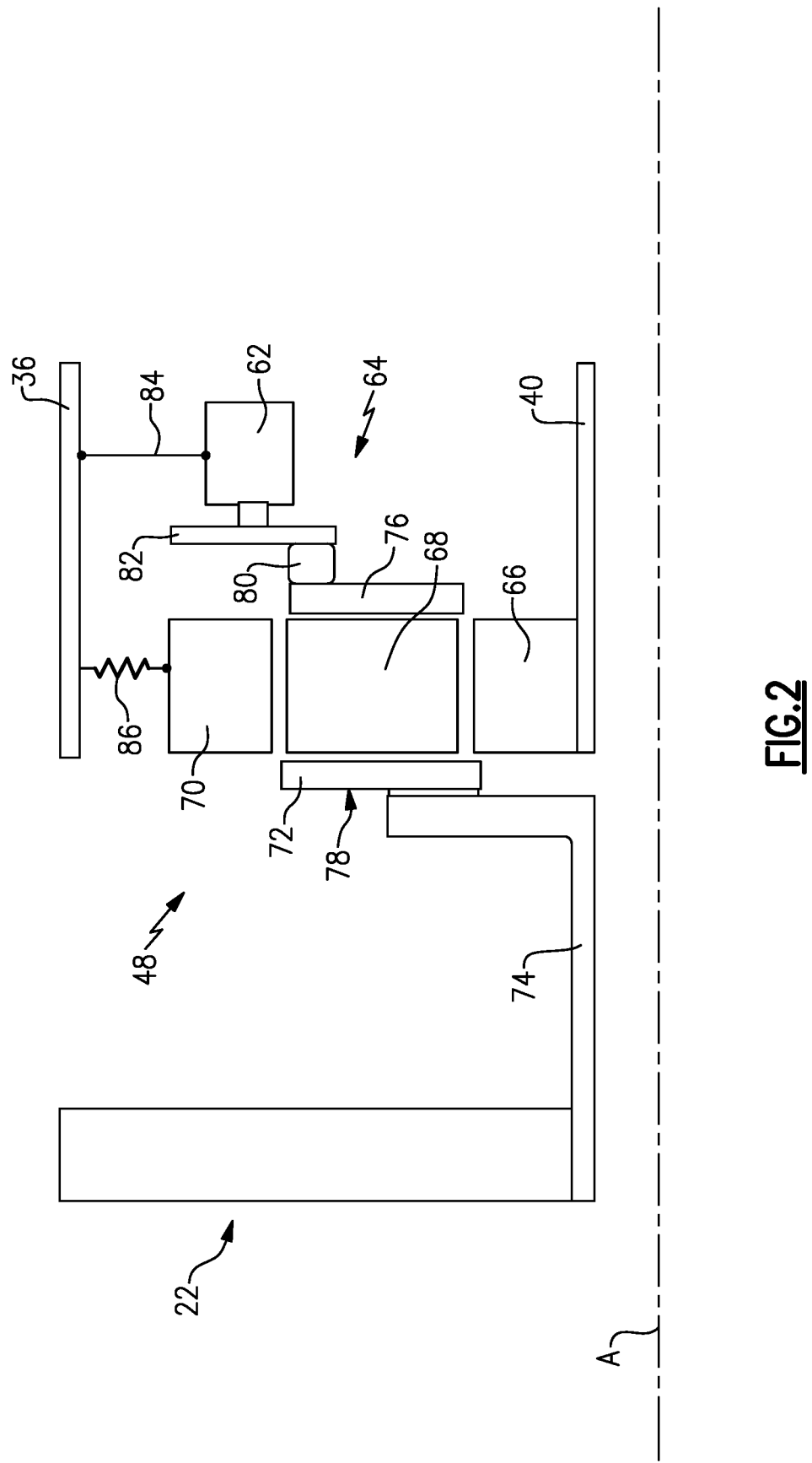
FIG. 2 is a schematic view an example fan drive gear system embodiment.
Figure 3:
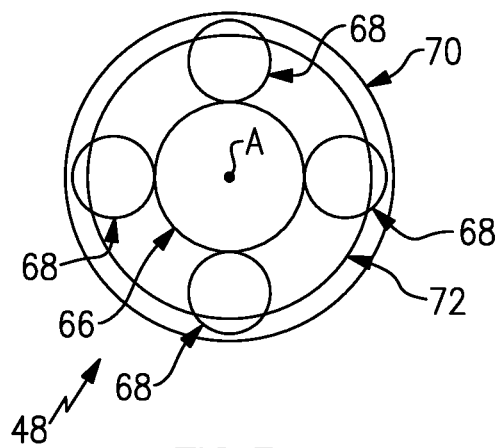
FIG. 3 is another schematic view of the example fan drive gear system embodiment shown in FIG. 2.

Referring to FIGS. 2 and 3 with continued reference to FIG. 1, the example fan drive gear system 48 is an epicyclic gear system with a sun gear 66 engaged to a plurality of intermediate gears 68 supported by a carrier 72. A ring gear 70 circumscribes the intermediate gears 68 and is engaged to each of the intermediate gears 68. In the example embodiment shown in FIG. 2, the ring gear 70 is fixed or flexibly mounted to a static engine structure 36 and the carrier 72 rotates about the axis A and provides a drive output through the fan shaft 74 that drives the fan section 22. Accordingly, example epicyclic gear system 48 may be referred to as a planet gear system.

The carrier 72 includes an aft portion 76 and a forward portion 78. The forward portion 78 is coupled to the fan shaft 74. The aft portion 76 includes a gear 80 that is engaged to a driven gear 82 of the accessory component 62. The carrier 72 rotates about the engine axis A and drives the fan section 22. Although the example gear 80 and driven gear 82 is illustrated as the example coupling 64, a gear system or other gear combinations could be utilized and are within the contemplation and scope of this disclosure.

The accessory component 62 includes a mount 84 attached to the engine static structure 36. The ring gear 70 is attached to the engine static structure 36 through a flexible mount 86. The flexible mount 86 enables the ring gear 70 to accommodate some relative movement with the carrier 72 and to maintain alignment with the intermediate gears 68.

Similarly, the mount 84 supporting the accessory component 62 could be a fixed, rigid mount or may be flexible similar to the mount 86.

A fixed mounting is a substantially rigid mounting where a flexible mounting provides some intended flexibility to allow movement that accommodates relative misalignment or movement between mated parts. In the disclosed examples, portions of the fan drive gear system 48 that do not rotate about the engine axis and are attached to the engine static structure may be fixed or flexibly mounted and remain within the scope and contemplation of this disclosure. Moreover, in some embodiments, components may be fixed to each other while the combination of components are flexibly mounted to the engine static structure. The mount 84 could be flexible and utilized to accommodate misalignment and/or relative movement to maintain engagement between the gear 80 and driven gear 82.

Figure 4:
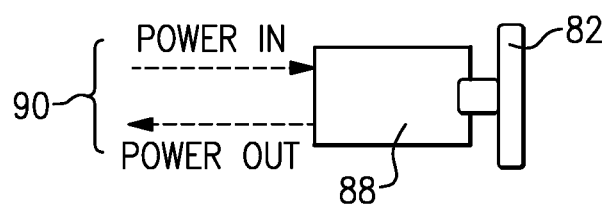
FIG. 4 is a schematic view of an example accessory component embodiment.
Figure 5:
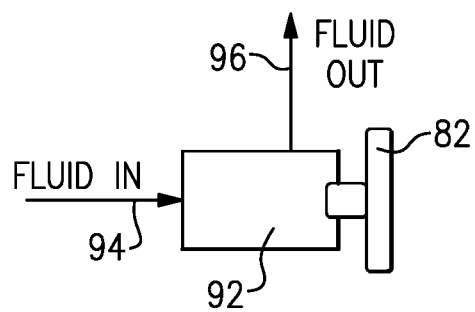
FIG. 5 is a schematic view of another example accessory component embodiment.

Referring to FIGS. 4 and 5 with continued reference to FIG. 2, the accessory component 62 may be any device that is driven to support engine operation. In one example embodiment, the accessory component is an electric motor/generator 88 as shown in FIG. 4. The motor/generator 88 may operate to either received or produce electric power 90. In another example embodiment, the accessory component is a fluid pump 92 as shown in FIG. 5. The example fluid pump 92 receives in inlet fluid flow 94 and exhausts an outlet flow 96 and an increased pressure or flow as compared to the inlet fluid flow 94. The fluid pump 92 may pump lubricant, fuel, hydraulic fluid, and/or any other fluid utilized in support of engine and aircraft operation.

Figure 6:
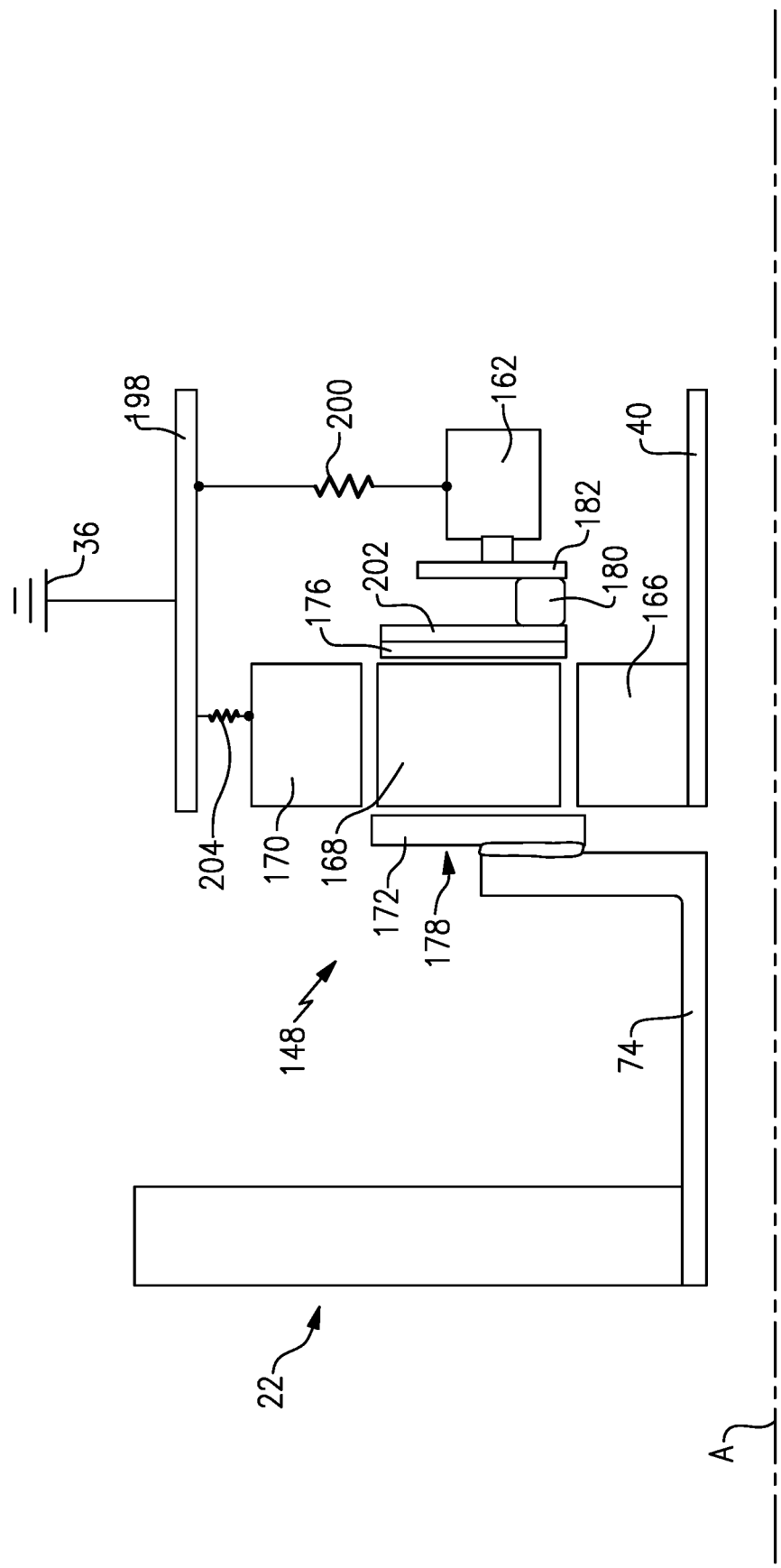
FIG. 6 schematic view of another example fan drive gear system.

Referring to FIG. 6, another example fan drive gear system 148 includes a sun gear 166 driven by an engine shaft 40 about the axis A. The sun gear 166 is engaged to drive the intermediate gears 168 that are supported in the carrier 172. The intermediate gears 168 are engaged to a fixed ring gear 170. The carrier 172 rotates about the axis A and includes an aft portion 176 and a forward portion 178. The forward portion 178 is attached to the fan shaft 174. The aft portion 176 includes a torque frame schematically indicated at 202. A gear 180 is attached or integrally formed as part of the torque frame 202. The accessory component 162 includes a driven gear 182 engaged and driven by the gear 180. Accordingly, the carrier 172 drives the fan section 22 through the fan shaft 174 and the accessory component 162 through the gear 180.

The example gear 180 is shown schematically by way of example as being attached to the torque frame 202. The gear 180 may be attached to the torque frame 202 or may be integrally formed as part of the torque frame 202. Moreover, the example gear 180 may be attached to the aft portion 176 of the carrier 172 as is shown in the embodiment described in FIG. 2.

The accessory component 162 is attached to mount 198 for the fan drive gear system 148. The mount 198 is attached to a static engine structure 36. The ring gear and the component 162 are attached to the mount 198 through respective flexible mounts 204 and 200. The flexible mounts 204 and 200 are shown schematically and may be separate from each other as shown or may be formed as a single integral part.

The gear 180 and driven gear 182 may be configured to provides a gear ratio to drive the component 162 at a desired speed relative to a speed of the carrier 172. The gear ratio between the gear 180 and the driven gear 182 may provides an increase in speed of the driven gear 182 or a speed reduction relative to a speed of the carrier 172 to accommodate component operation.

Moreover, although a single accessory component 162 is shown and described by way of example, additional accessory components 162 could be included and remain within the contemplation and scope of this disclosure.

Accordingly, the example fan drive gear systems 48, 148 provide a speed reduction for driving the fan section 22 and for operation and driving an accessory component.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A fan drive gear system for a turbine engine comprising:
    a sun gear configured to be driven by an engine shaft rotatable about an axis;
    a plurality of intermediate gears coupled to the sun gear;
    a ring gear coupled to the plurality of intermediate gears;
    a carrier supporting rotation of the plurality of intermediate gears, wherein the carrier includes a gear portion; and
    an accessory component that is coupled to the gear portion of the carrier.

2. The fan drive gear system as recited in claim 1, wherein the ring gear assembly is attached to a static engine structure and the carrier is rotatable about the axis.

3. The fan drive gear system as recited in claim 2, further comprising a flexible coupling between the ring gear and the static engine structure and the accessory component is mounted to the flexible coupling.

4. The fan drive gear system as recited in claim 2, wherein the accessory component is mounted downstream of the carrier to a portion of the static engine structure.

5. The fan drive gear system as recited in claim 1, wherein the carrier includes a forward side and an aft side and the gear portion is mounted to the aft side of the carrier.

6. The fan drive gear system as recited in claim 1, wherein the carrier comprises a carrier frame and a torque frame and the gear portion is mounted to the torque frame.

7. The fan drive gear system as recited in claim 1, wherein the gear portion is formed as an integral portion of the carrier.

8. The fan drive system as recited in claim 1, further comprising a flexible mount between the ring gear and a static engine structure and both the ring gear and the accessory component are mounted to the flexible mount.

9. The fan drive gear system as recited in claim 1, wherein the accessory component comprises a fluid pump.

10. The fan drive gear system as recited in claim 1, wherein the accessory component comprises an electric motor/generator.

11. A turbine engine assembly comprising:
    a static engine structure;
    a fan section including a plurality of blades rotatable about an axis;
    a fan drive gear system including a sun gear configured to be driven by an engine shaft rotatable about an axis, a plurality of intermediate gears coupled to the sun gear, a ring gear coupled to the plurality of intermediate gears, and a carrier supporting rotation of the plurality of intermediate gears, wherein the carrier includes a gear portion;
    an accessory component that is coupled to the gear portion of the carrier; and
    a fan drive shaft coupled to carrier to drive the fan section.

12. The turbine engine assembly as recited in claim 11, wherein the ring gear assembly is fixed to a static engine structure through a flexible mount, the carrier is rotatable about the axis and the accessory component is mounted to the static engine structure.

13. The turbine engine assembly as recited in claim 11, wherein the ring gear assembly is attached to a static engine structure through a flexible coupling, the carrier is rotatable about the axis and the accessory component is mounted to the flexible coupling.

14. The turbine engine assembly as recited in claim 11, wherein the accessory component is mounted downstream of the carrier to a portion of the static engine structure.

15. The turbine engine assembly as recited in claim 11, wherein the carrier includes a forward side and an aft side and the gear portion is mounted to the aft side of the carrier.

16. The turbine engine assembly as recited in claim 11, wherein the accessory component comprises one of a fluid pump or an electric motor/generator.

17. A method of powering an accessory component of a turbine engine assembly comprising:

assembling a fan drive gear system including a sun gear configured to be driven by an engine shaft rotatable about an axis, a plurality of intermediate gears coupled to the first gear portion of the sun gear, a ring gear coupled to the plurality of intermediate gears, and a carrier supporting rotation of the plurality of intermediate gears, wherein the carrier includes a gear portion;

mounting an accessory component proximate the fan drive gear system;

coupling a driven gear of the accessory component to the gear portion of the carrier; and coupling a fan drive shaft to the carrier to drive a fan section.

18. The method as recited in claim 17, further comprising assembling the fan drive gear system such that the ring gear assembly is attached to a static engine structure through a flexible mount, the carrier is rotatable about the axis and the accessory component is mounted to the static engine structure.

19. The method as recited in claim 17, further comprising assembling the fan drive gear system such that the ring gear assembly is attached to a static engine structure through a flexible mount, the carrier is rotatable about the axis and the accessory component is mounted to the flexible coupling.

20. The method as recited in claim 17, further comprising assembling the fan drive gear system such that the gear portion is an integral part of the carrier.

* * * * *